(12) United States Patent
Berggren et al.

(10) Patent No.: US 11,172,424 B2
(45) Date of Patent: Nov. 9, 2021

(54) CONNECTION ESTABLISHMENT OF A TERMINAL OVER A RELAY NODE IN A WIRELESS COMMUNICATION SYSTEM

(71) Applicant: SONY MOBILE COMMUNICATIONS INC., Tokyo (JP)

(72) Inventors: Anders Berggren, Lund (SE); Lars Nord, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 122 days.

(21) Appl. No.: 16/487,235

(22) PCT Filed: Mar. 12, 2018

(86) PCT No.: PCT/EP2018/056088
§ 371 (c)(1),
(2) Date: Aug. 20, 2019

(87) PCT Pub. No.: WO2018/162759
PCT Pub. Date: Sep. 13, 2018

(65) Prior Publication Data
US 2021/0136655 A1   May 6, 2021

(30) Foreign Application Priority Data
Mar. 10, 2017   (EP) .................................. 17160243

(51) Int. Cl.
*H04W 40/24* (2009.01)
*H04W 28/02* (2009.01)

(52) U.S. Cl.
CPC ....... *H04W 40/24* (2013.01); *H04W 28/0226* (2013.01)

(58) Field of Classification Search
None
See application file for complete search history.

(56) References Cited

U.S. PATENT DOCUMENTS 10,045,358 B2 * 8/2018 Berggren ............ H04W 72/085
10,375,747 B2 * 8/2019 Sang ..................... H04W 76/14
(Continued)

FOREIGN PATENT DOCUMENTS

GB      2460701 A  * 12/2009  ............ H04W 40/22

OTHER PUBLICATIONS

International Search Report and Written Opinion from corresponding International Patent Application No. PCT/EP2018/056088, dated Jun. 19, 2018, 14 pages.
(Continued)

*Primary Examiner* — Tri H Phan
(74) *Attorney, Agent, or Firm* — Tucker Ellis LLP (57) ABSTRACT

A method carried out in a terminal (100) for setting up a connection with a wireless communication network including a network node (10), comprising transmitting terminal preference data (51) to the radio network, said terminal preference data indicating terminal preference to receive one of direct or indirect downlink transmission when the terminal (100) operates over a relay in the uplink; transmitting a service request (54) to the network node (10) over a relay (200); receiving information (57) from the network node (10) indicating direct or indirect downlink data transmission; receiving resource data (58) for a connection configured according to said information.

19 Claims, 7 Drawing Sheets

(56) References Cited

U.S. PATENT DOCUMENTS

| | | | |
|---|---|---|---|
| 10,405,257 B2 * | 9/2019 | Martin | H04W 40/22 |
| 10,484,926 B2 * | 11/2019 | Panteleev | H04W 40/22 |
| 10,924,912 B2 * | 2/2021 | Kim | H04W 48/08 |
| 2009/0185492 A1 | 7/2009 | Senarath | |
| 2012/0124088 A1 | 5/2012 | Meshkati | |
| 2016/0044613 A1 | 2/2016 | Cai | |
| 2016/0286564 A1 | 9/2016 | Berggren | |
| 2018/0092017 A1 * | 3/2018 | Freda | H04W 76/23 |
| 2019/0239147 A1 * | 8/2019 | Chun | H04W 48/16 |
| 2019/0357101 A1 * | 11/2019 | Stojanovski | H04W 36/0022 |

OTHER PUBLICATIONS

ZTE Corporation: "FS_SMARTER-mIoT clean up section 5.2.3," GPP Draft; S1-160047 mIoT clean up 5.2.3r4, 3rd Generation Partnership Project (3GPP), Jan. 31, 2016, 2 pages.

InterDigital: "Selection criteria for UE as a Relay: Discussion," 3GPP Draft; 1173 relay selection discussion, 3rd Generation Partnership Project (3GPP), Feb. 12, 2017, 2 pages.

* cited by examiner

CONNECTION ESTABLISHMENT OF A TERMINAL OVER A RELAY NODE IN A WIRELESS COMMUNICATION SYSTEM

TECHNICAL FIELD

This disclosure relates to methods and devices for use in a radio communication system, in which a connection is established or modified between a terminal and a network node of a wireless communication network. Specifically, presented solutions are related to scenarios which involve relaying information or data over a relay node, between the terminal and the network node.

BACKGROUND

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The widespread deployment of third and fourth generation networks has led to the parallel development of a number of new infrastructure architectures involving a variety of classes of devices, of wireless access point units and of applications which may require different data rates, coverage areas or transmission powers. Unlike a conventional third or fourth generation communication terminal such as a smartphone, a whole new segment of devices has been considered, including devices which are relatively simple and inexpensive, having a reduced capability. Examples of recent developments include so-called machine type communication (MTC) applications and Internet-of-Things (IoT) devices, which may be configured as by semi-autonomous or autonomous wireless communication devices communicating small amounts of data on a relatively infrequent basis. Examples include so-called smart meters which, for example, are located in a customer's house and periodically transmit information back relating to the customers consumption of a utility such as gas, water, electricity and so on. Other examples may include simple sensors or meters, wearable devices and communication devices that may be placed on any object for tracking.

Whilst it can be convenient to have different systems addressing different needs from different mobile network users, the additions of new infrastructure and new services can also create an infrastructure problem, which is not desirable in a mobile network. There are predominantly three parameters which can be changed in order to increase Radio Access network capacity: higher spectral efficiency, more radio spectrum and denser cell layout. In order to meet an expected large increase in the number of communication devices, small cells are getting a lot of attention. However, there are still limitations on network capacity and the geographical areas that can be served by such networks. These limitations may, for example, be particularly relevant in situations in which networks are experiencing high load and high-data rate communications between communication terminals, or when communications between communication terminals are required but the communication terminals may not be within the coverage area of a network. The coverage area of Internet-of-Things (IoT) devices have been reduced, since they are allowed to transmit with lower output power than normal smartphones. This has created an unbalanced link budget for these devices, the uplink coverage is less than the downlink coverage area. In order to address these limitations, in LTE releases-12 and -13, the ability for LTE communication terminals to perform device-to-device (D2D) communications has been introduced and developed.

D2D communications allow communication terminals that are in close proximity to communicate directly with each other, both when within and when outside of a coverage area or when the network fails. This D2D communications ability can allow user data to be more efficiently communicated between communication terminals by obviating the need for user data to be relayed by a network node such as a base station, and also allows communication terminals that are in close proximity to communicate with one another although they may not be within the coverage area of a network.

D2D communications may also allow a first communication terminal to communicate with a base station via a second communication terminal, so that the second communication terminal acts as a relay node. This allows coverage extension when the first communication terminal is out of coverage of the base station, for example. Alternatively, the first communication terminal may be within coverage of the base station but may nonetheless communicate with the base station via the second communication terminal. In this case, the second communication terminal can be granted the right to manage the first communication terminal (including control of mobility, resource allocation, etc.), and thus provides a means for the network capacity to be increased. This may be beneficial, e.g. for simple D2D devices, since it may provide the possibility to limit output power on the radio transceiver, when a relay node is closer than the serving base station, but also for a terminal that may not support extended coverage using repetitions or which prefers to not operate in Extended Coverage mode.

Agreements within 3GPP associated with Layer 2 Relay may be found in TR 36.746. In November 2016 a corresponding study in SA2 started called REAR (Relay for wearable), studying system impact to support Layer 2 relay. Result from the REAR study can be found in TR 23.733. Layer 3 relay specified in TS 23.303, and TS 36.331 sets the baseline for discovery or relay function and how to request and set-up a Layer 3 relay link between the Remote terminal, or User Equipment (UE), and Network. The relay, or relay node, acts as an IP router and each remote terminal will be provided a unique IP address in the local IP network that the IP router manages. The IP data is embedded in the relay node's EPS traffic, towards the network. To be able to perform lawful interception the relay node needs to inform the MME of the Remote terminal's identity that the relay is serving. Based on this information the network can then inspect each Remote terminal's IP packets.

An open issue relates to whether to use Uni-directional or bi-directional link towards the terminal. Uni-directional link meaning that the downlink (DL) to the remote terminal is sent directly from the eNB over Uu and the uplink (UL) from the remote terminal is sent indirectly to the eNB via a relay (PC5+Uu of the relay). Bi-directional means both DL and UL is sent via the relay (PC5+Uu of the relay). Related to the uni-directional and bi-directional link discussion is how to page the remote terminal and set up a communication connection and transfer the terminal to Connected mode. Various discussed Paging occasion options include that the relay node, i.e. the terminal acting as a relay, monitors relay terminal PO only (single paging occasion); that the relay node monitors remote terminal PO (multiple paging occasions); that the remote terminal monitors Uu (direct DL paging); and that the relay node monitors paging occasions that are aligned between the remote terminal and relay node PO. The third option suggests that the DL page message is monitored directly by the remote terminal, basically proposing a uni-directional link configuration. However, whatever paging option is selected, it need not be suitable for a specific remote terminal at all instances.

SUMMARY

The use of either uni- or bi-directional links may depend on several factors, such as terminal capability, terminal preference and Network preference. In certain radio environment, the terminal may prefer to receive in the downlink via direct link, instead of via a relay node. In other scenarios the terminal may prefer to only camp on a relay node and receive all downlink information, system information, paging, and user data transfer, via the relay node. But in some scenarios the terminal may prefer a mix of these different approaches, A solution is therefore proposed herein, whereby the Remote terminal is configured to indicate preference for using either a direct link or an In-direct link via a relay in the downlink reception.

According to a first aspect, a method carried out in a terminal is provided, for setting up a connection with a wireless communication network including a network node, comprising transmitting terminal preference data to the radio network, said terminal preference data indicating terminal preference to receive one of direct or indirect downlink transmission when the terminal operates over a relay in the uplink;

transmitting a service request to the network node over a relay;

receiving information from the network node indicating direct or indirect downlink data transmission;

receiving resource data for a connection configured according to said information.

Throughout this document the term Service Request includes both the NAS message and radio control signaling in order to setup the communication between the network and terminal.

In one embodiment, said terminal preference data indicates preference of direct or indirect downlink transmission associated with one or more of system information, paging, and downlink data.

In one embodiment, transmission of the service request is triggered by the terminal preparing to send data.

In one embodiment, transmission of the service request is triggered by receiving downlink paging from the network.

In one embodiment, said terminal preference data is transmitted in a Non Access Stratum procedure.

In one embodiment, terminal preference data is transmitted in radio control signaling, e.g. RRC messages used in 3GPP.

In one embodiment, the method comprises transmitting an in-coverage indicator to the network, indicating whether the terminal is in or out of downlink coverage dependent on signal quality detected from said network node.

According to a second aspect, a method carried out in a wireless communication network is provided, including a network node for setting up a connection with a terminal, comprising receiving terminal preference data, said terminal preference data indicating terminal preference to receive one of direct or indirect downlink transmission when the terminal operates over a relay in the uplink;

receiving a service request from the terminal over a relay;

transmitting information to the terminal, indicating direct or indirect downlink data transmission;

transmitting resource data for a connection configured according to said information.

In one embodiment, terminal preference data indicates preference of direct or indirect downlink transmission associated with one or more of system information, paging, and downlink data.

In one embodiment, said service request is triggered by the terminal preparing to send data.

In one embodiment, the method comprises transmitting a paging message to the terminal from the network node responsive to receiving a paging request from a core network, wherein said service request is triggered by said paging message. The paging request may include the terminal preference to receive the paging message via direct or indirect downlink transmission.

In one embodiment, the method comprises transmitting said paging message in accordance with said terminal preference data.

In one embodiment, said terminal preference data is received in a Non Access stratum procedure by the terminal.

In one embodiment, said terminal preference data is received from the terminal in radio control signaling.

In one embodiment, said information is determined based on at least radio traffic data detected in the network node, with said terminal preference data as preference.

In one embodiment, the method comprises receiving an in-coverage indicator from the terminal, associated with signal quality from said network node detected by the terminal.

In one embodiment, said in-coverage indicator is received in a terminal-initiated service request procedure.

In one embodiment, said information indicates indirect downlink data transmission responsive to said in-coverage indicator indicating that the terminal is out of coverage from the network node.

According to a third aspect, method for bearer modification is provided for a terminal in connected mode communication with a network node of a wireless communication network, wherein the terminal is configured with an indirect uplink connection via a relay and a direct downlink connection from the network node, comprising measuring signal quality of downlink data from the network node in the terminal;

transmitting a signal quality measurement to the network node;

transmitting an in-coverage indicator, indicating out of coverage, based on the detected signal quality;

receiving bearer modification data of an indirect downlink connection from the network node, responsive to transmitting said in-coverage indicator.

BRIEF DESCRIPTION OF THE DRAWINGS

A more complete appreciation of the disclosure and advantages thereof will be readily obtained as the same becomes better understood by reference to the following detailed description when considered in connection with the accompanying drawings, wherein like reference numerals designate identical or corresponding parts throughout the several views, and wherein.

DETAILED DESCRIPTION

Hereinafter preferred embodiments of the present technique will be described in detail with reference to the appended drawings. Note that, in this specification and appended drawings, structural elements that have substantially the same function and structure are denoted with the same reference numerals, and repeated explanation of these structural elements is omitted.

Figure 1:
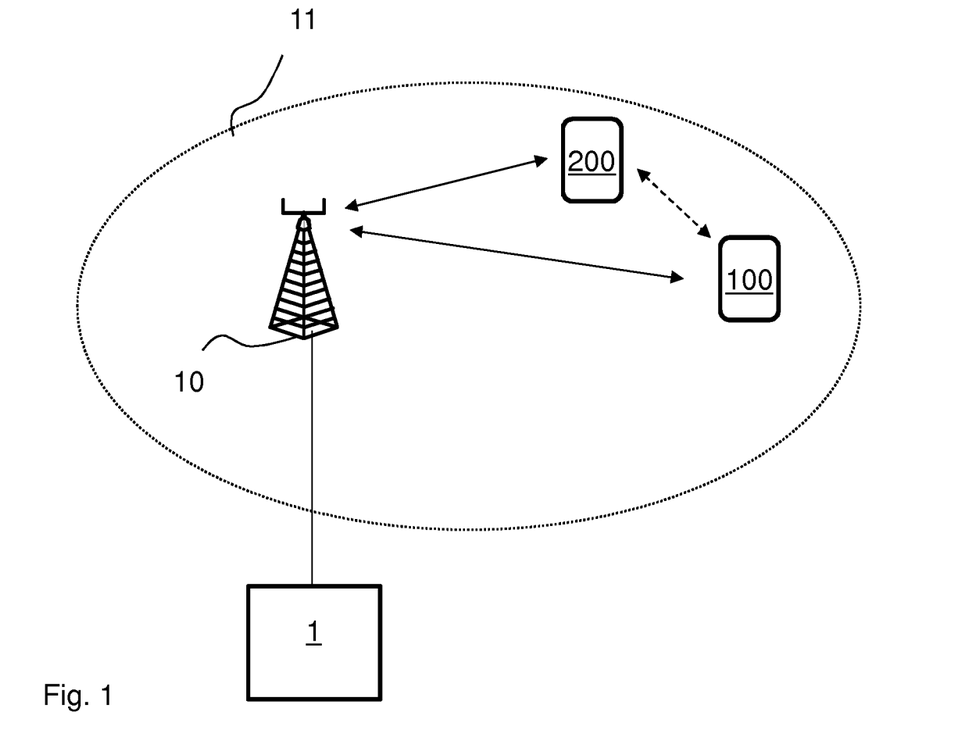
FIG. 1 schematically illustrates a relay scenario for a terminal in a wireless communication system.

FIG. 1 provides a schematic diagram of a wireless communication system, in which a wireless communication network includes a core network 1 and at least one network node 10, such as an access node. The network node may also be referred to as a base station and may e.g. be an enhanced Node B (eNodeB or eNB) of an LTE network or a gNB of a 5G network. An access node provides a wireless access interface to the one or more communication terminals 100, 200 within a coverage area or cell 11. The wireless communication system may thus be referred to as a cellular telecommunications system, which typically operates by radio communication.

Herein, communication terminals of the wireless communication system are referred to as terminals 10, 200 for short. In a 3GPP wireless communication system, such terminals 100, 200 may be referred to as User Equipment, UE. The terminals 100, 200 may communicate messages, control data and user data via the transmission and reception of signals representing data using the wireless access interface. The network node 10 is communicatively linked to core network components, illustrated in the drawing by one representative network element 1, such as a serving gateway support node and an external network, which may be connected to one or more other communications systems or networks. The terminals 100, 200 are configured to communicate with one or more other communication terminals served by the same or a different coverage area via the network node 10, or with servers or other entities outside the communication network. Communication in the direction from the network node 10 to the terminals 100, 200 is referred to as downlink communication, whereas communications from the terminals 100, 200 to the network node 10 is referred to uplink communication.

Although cellular communications system such as those based on the previously released LTE standards have been commercially successful, a number of disadvantages are associated with such centralized systems. For example, if two terminals which are in close proximity wish to communicate with each other, uplink and downlink resources sufficient to convey the data are required. Consequently, two portions of the system's resources are being used to convey a single portion of data. This limitation may be problematic when the system is experiencing high load or base station coverage is not available, for instance in remote areas. Overcoming these limitations may increase both the capacity and efficiency of LTE networks but also lead to the creations of new revenue possibilities for LTE network operators. D2D communications offer the possibility to address the aforementioned problems of network capacity and the requirement of network coverage for communications between terminals.

As previously discussed, D2D communications may also allow a first terminal 100 to communicate with a network node 10 via a second terminal 200, wherein the second terminal 200 acts as a relay node. This allows coverage extension when the first terminal 100 is out of coverage of the base station, for example. Alternatively, the first terminal 100 may be within coverage of the network node 10 but may nonetheless communicate with the network node 10 via the second terminal 200.

Figure 2:
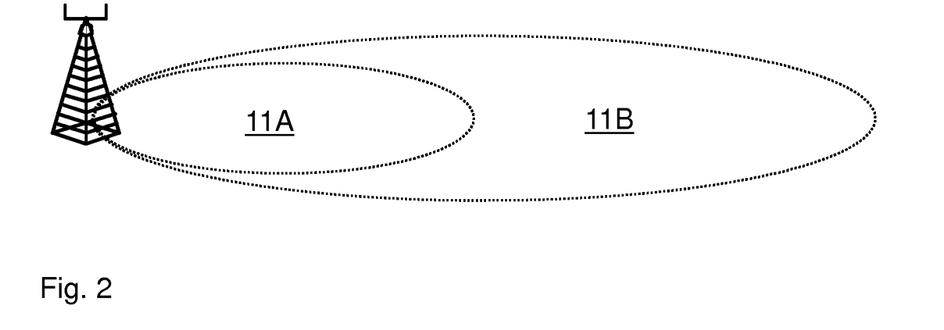
FIG. 2 schematically illustrates UL and DL coverage for a terminal with respect to a network node in a wireless communication network of the radio communication system.

With reference to FIGS. 1 and 2, various D2D terminals 100, such as small IoT/wearable devices, which may e.g. be configured to operate under the specifications associated with NB-IoT or eMTC, may be allowed to have a relaxed Transmitter performance. In such a case, the link budget for UL and DL will become unsymmetrical. The terminal 100 will be able to receive DL data/info in the coverage area 11B of the entire cell, but only transmit UL data in a smaller area 11A closer to the network node 10. This represents one example where a terminal 100 may have different preferences for communication with the network, i.e. where an operator has a network deployment where the UL coverage is much smaller than the DL coverage.

On a general level, solutions are proposed herein for a remote terminal to dynamically indicate its preference the network, such as to a network node 10 and a Mobile Management Entity (MME) of a core network 1, related to how the terminal 100 prefers to receive downlink data and information in a relay situation. On the one hand, a terminal 100 may be configured with preference for direct downlink reception of certain signals over a Uu link from a network node 10, as indicated by the full-drawn arrow in FIG. 1, whereas the terminal 100 may be configured with preference for indirect downlink reception of other signals over a PC5 link from the network node 10, via a relay node 200, as represented by the dashed arrow.

A terminal 100 is configured to receive system information and to listen for paging in idle mode and is configured to receive data in the downlink and transmit data in the uplink in connected mode. In various embodiments, the indication of preference is related to one or more of the following DL areas:

System information (Direct/In-direct)
Paging (Direct/In-direct)
Connected mode downlink data transfer (Direct/In-direct)

This downlink preference may be indicated to the network by means of terminal preference data, which provides an indication related to on or more of the aforementioned DL scenarios. In various embodiments, the terminal preference data may be provided to the network 1, 10 by the terminal 100. Providing the data to the network may be accomplished in an attach procedure, i.e. when the terminal 100 first communicates with the network to establish its part of the wireless communication system, e.g. by including the terminal preference data in Capability signaling. In an attach message, the terminal 100 may e.g. indicate its capability to support either or both unidirectional and bidirectional mode. Capability signaling may also include an indication of preference to always receive downlink direct while using a relay for the uplink (preference=unidirectional, could be e.g. bitmapped "001").

Terminal preference data may additionally, or alternatively, be transmitted in accordance with a predetermined schedule or repetition cycle, or when the terminal 100 makes an update transmission to the network, e.g. when reporting network node signal quality measurements to the network, during association to a relay node 200, or dynamically with RRC signaling upon connection establishment or modification when conditions are changing. In one embodiment, the terminal preference data may include an identification of a type or class of terminal, tied to a specified default selection of preference related to direct or indirect DL transmission, rather than the specific indication of preference. In such an embodiment, the network may ascertain downlink preference for a specific terminal 100 from stored preference data, e.g. determined by specification or by terms of a subscription to an operator of the wireless communication system, which stored data is accessible using the identification received in terminal preference data from the terminal 100.

Additionally, the terminal may in various embodiments be configured to set, and transmit to the network, an in-coverage indicator, providing the terminal's indication of whether the terminal 100 is In or Out of DL coverage with the network node 10 on which the terminal 100 is camping. Such a coverage indicator may e.g. be a binary indicator, such as a code or flag, which may be transmitted as a message, indicating yes or no.

The terminal preference indicator in accordance with the examples above is only valid in case of use of relay, where uplink traffic (signaling and data) is transmitted via the relay node 200. In other words, the relay node is at least used in the uplink. Based on connected mode measurement reporting, the network node 10 may also handle possible change between direct (unidirectional) and indirect (bidirectional) link and vice versa. In the end it may be to the network, such as the access node 10 or a node 1 of the core network to make the decision about setting up and changing link, based on explicit indication, earlier provided preferences and measurement reports from the terminal 100.

Figure 3:
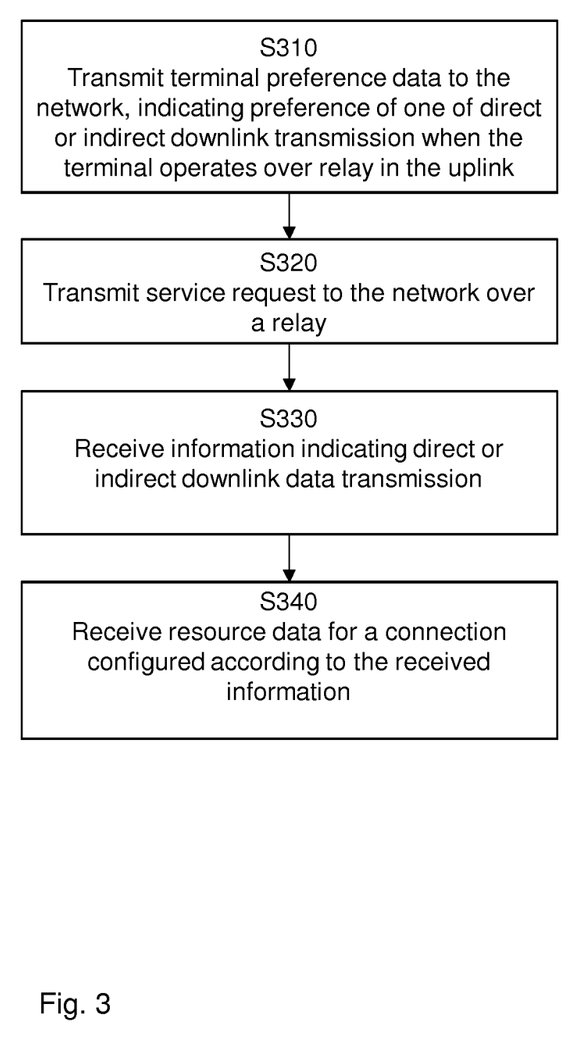
FIG. 3 illustrates an embodiment of a method carried out in a terminal according to various embodiments.

A first general embodiment will now be described with reference to FIG. 3, representing steps carried out in a terminal 100 which communicates with a network node 10 of a wireless communication network. Furthermore, the remote terminal 100 is associated with a relay node 200, at least for uplink communication. The method broadly relates to a method carried out in the terminal 100 for setting up a connection with the wireless communication network including the network node 10, such as an access node.

In a step S310, the terminal is configured to transmit terminal preference data to the wireless communication network, through the network node 10, possibly for further communication to a core network node 1. The terminal preference data indicates preference of one of direct or indirect downlink transmission to apply in cases when the terminal operates over relay in the uplink or before the uplink connection is established. The terminal preference data may indicate the preference explicitly, e.g. by means of a particular code which is associated to a selection of direct or indirect connection. Alternatively, the terminal preference data may indicate the preference implicitly, by means of an indicator identifying the terminal 100, which is associated with a stored preference, accessible by the network. The terminal preference data may be transmitted in a Non Access stratum procedure, such as attach or TAU for 4G, or initial registration or re-registration in 5G. In another embodiment, the terminal preference data may be transmitted in a RRC signaling.

In step S320, the terminal 100 is configured to transmit a service request to the network over a relay node 200, whereby the terminal initiates a service request procedure with the network node 10. While the terminal initiates the service request procedure, it may be triggered by different causes. In one scenario, initiation of the service request is triggered by the terminal preparing to send data. In another scenario, initiation is triggered by receiving downlink paging from the network. The terminal 100 is configured to detect the trigger, so as to initiate the service request procedure with the network. In various embodiments, the terminal 100 may be configured to determine its coverage status in the downlink, based on measured signal quality on signals received from the network node 10. The terminal 100 may further be configured to set an in-coverage indicator dependent on the detected signal quality from said network node 10, or even based on absence of a received signal. The terminal may be configured to transmit the in-coverage indicator to the network node 10, e.g. in said service request procedure. In one embodiment, the network node may be configured to provide said information to indicate indirect downlink data transmission, responsive to said in-coverage indicator indicating that the terminal 100 is out of coverage from the network node 10. This decision may thus override the preference as indicated in the terminal preference data.

In step S330, the terminal is configured to receive information from the network node 10, indicating direct or indirect downlink data transmission. The network will preferably be in control of whether indirect or direct downlink communication is to be established. However, in preferred embodiments, the network may take the preference as indicated by the terminal preference data be taken into consideration. The information, indicating direct or indirect downlink data transmission, is preferably determined in the network based on at least radio traffic data detected in the network node 10, but where said terminal preference data is used as preference. As an example, unless the detected traffic in the cell of the network node is deemed to exceed a certain level, the network node 10 may e.g. be configured to provide said information to acknowledge, or specifically indicate, use of the preferred downlink connection option as indicated by the terminal preference data. In an alternative embodiment, the information sent by the network node 10 may be configured to specify direct or indirect connection in the downlink only if a decision is taken in the network node 10 to not follow the terminal preference. A decision related to the particular downlink connection may be taken based on a collective traffic situation in the cell, as caused by all terminals camping on the network node 10.

In step S340, the terminal may be configured to receive resource data for a connection configured according to the information. This step may conclude the establishment of a connection for data communication, i.e. a transition to connected mode of the terminal.

Figure 4:
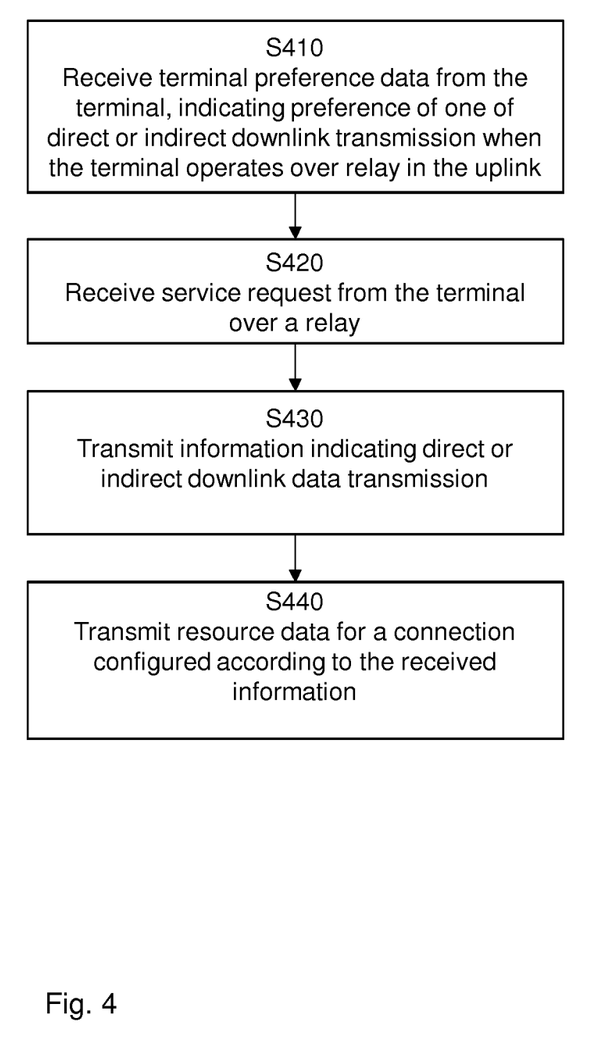
FIG. 4 illustrates an embodiment of a method carried out in a network node according to various embodiments.

A second general embodiment will now be described with reference to FIG. 4, representing steps carried out in a network node 10, which may be or include an access node, which communicates with a terminal 100 of a wireless communication network. Furthermore, the remote terminal 100 is associated with a relay node 200, at least for uplink communication. The method broadly relates to a method carried out in the network, such as in a network node which may be or include an access node, for setting up a connection with the terminal 100.

In a step S410, the network is configured to receive terminal preference data from the terminal. The terminal preference data indicates preference of one of direct or indirect downlink transmission when the terminal operates over relay in the uplink. As described with reference to FIG. 3, which is relevant also for the embodiment of FIG. 4, the terminal preference data may indicate the preference explicitly or implicitly. Examples given with reference to FIG. 3 are equally applicable to the embodiment of FIG. 4.

In step S420, the network, such as the network node 10, is configured to receive a service request to the network over a relay node 200, as caused by the terminal initiating a service request procedure with the network node 10. While the terminal initiates the service request procedure, it may be triggered by different causes, as outlined with reference to FIG. 3, which are applicable to the embodiment of FIG. 4 too.

In step S430, the network node 10 is configured to transmit information to the terminal 100, indicating direct or indirect downlink data transmission. The network will preferably be in control of whether indirect or direct downlink communication is to be established. However, in preferred embodiments, the network may take the preference as indicated by the terminal preference data be taken into consideration. The information, indicating direct or indirect downlink data transmission, is preferably determined in the network based on at least radio traffic data detected in the network node 10, but where said terminal preference data is used as preference. Examples provided for the embodiment of FIG. 3 are equally applicable to the embodiment of FIG. 4.

In step S440, the network node 10 may be configured to transmit resource data for a connection configured according to the information, to the terminal 100. This step may conclude the establishment of a connection for data communication, i.e. a transition to connected mode of the terminal.

Figure 5:
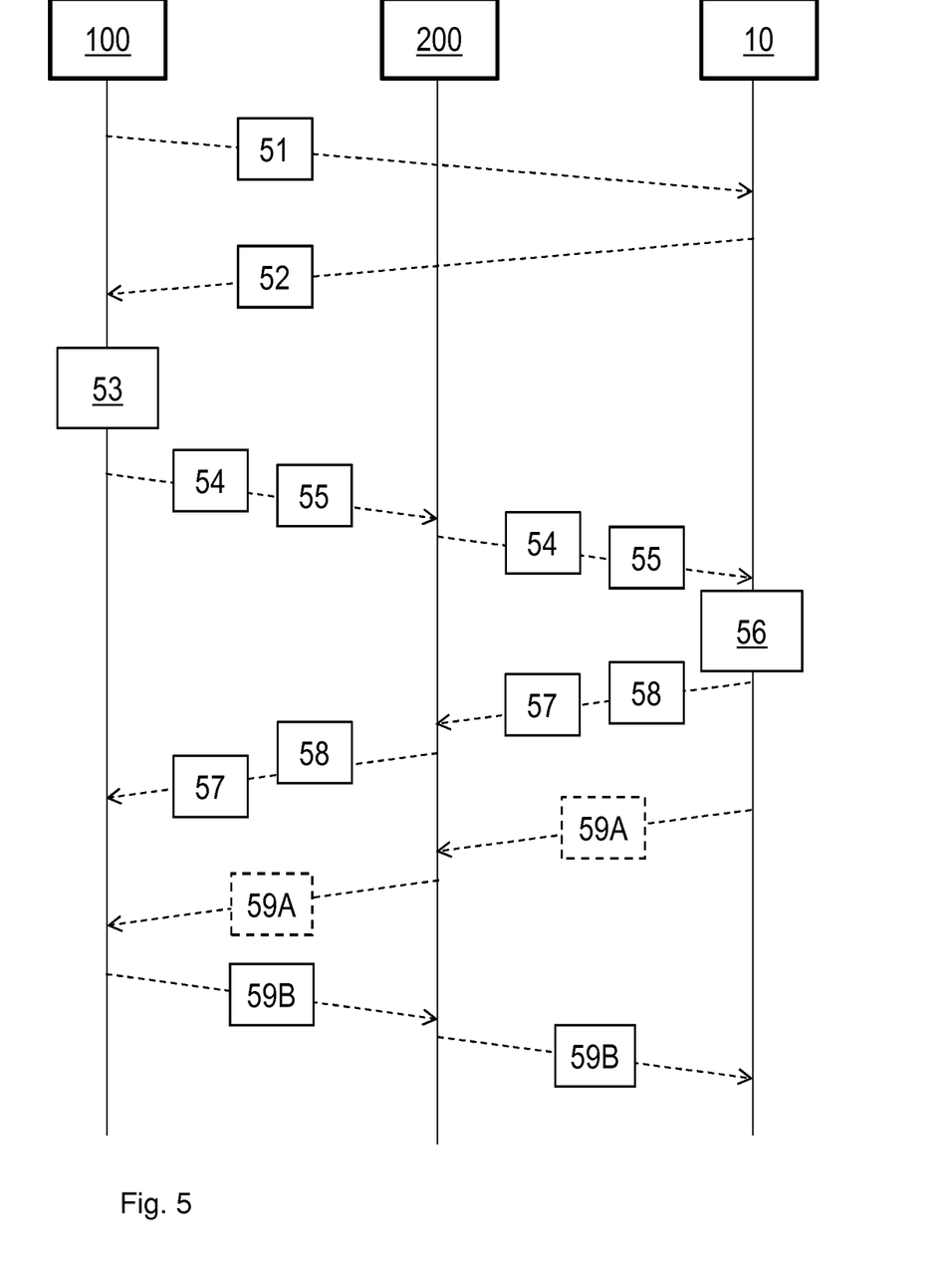
FIG. 5 schematically illustrates steps and signals conveyed in various embodiments, where connection setup is triggered by a terminal.

FIG. 5 schematically illustrates an exemplary embodiment of a method for setting up a connection between a terminal 100 and a wireless communication network including a network node 10, which falls within the scope of the general embodiments of FIGS. 3 and 4. The drawing indicates steps carried out by the terminal 100 and the network node 10, as well as signaling between these entities and also a relay node 200. It should be understood that not all steps or tasks required for setting up a connection may be illustrated. The actual process of setting up a connection over a relay, including detection and association with a relay, may as such be carried out as already provided in e.g. R12/R13 D2D as identified.

As indicated in the drawing, the terminal 100 is configured to provide terminal preference data 51 to the network 10. As noted, this may be accomplished in various ways, such as at initial attach, where the terminal 100 may signal capability of supporting both unidirectional and bi-directional mode when using a relay. The terminal preference data 51 may, in addition to, or alternatively, be provided in later signaling, and may then be accomplished by uplink transmission over a relay 200. In a first example, the terminal preference data may specify the terminal presence for downlink data as: System information=in-direct, paging=in-direct, connected=in-direct. In a second example, the terminal preference data may specify the terminal presence for downlink data as: System information=direct, paging=direct, connected=in-direct. The embodiment of FIG. 5 illustrates the second example.

While no cause for setting up a connection has occurred, the terminal 100 remains in idle mode, listening to direct downlink system information 52, as provided by the terminal preference data 51.

At a step 53, a cause or trigger to set up a connection to the network 10 occurs in the terminal 100. In the given example, the trigger may be that the terminal has data destined or scheduled to be transmitted in the uplink, such as a periodic Tracking Area Update, TAU or a timer. The terminal 100 thereby initiates a service request procedure.

Based on estimated uplink conditions, e.g. determined by the terminal 100 based on detected downlink conditions, the terminal 100 sends a service request 54 via the relay node 200 to the network 10. In a preferred embodiment, the service request, or a message included in the service request procedure, may include an in-coverage indicator 55, where the in-coverage indicator 55 is configured by the terminal 100 to indicate In-coverage. Note that the in-coverage indicator has the benefit of preventing the network from selecting direct downlink data connection (terminal preference was earlier set to direct mode for downlink data) if the terminal 100 is Out-of-coverage. In other words, had the terminal 100 determined that downlink reception from the network node 10 was poor, the in-coverage indicator would be set to indicate Out-of-coverage. In such a scenario, the network 10 would be configured, based on reception of the in-coverage indicator, to decide to override the preference of in-direct downlink data transmission.

In the Service request procedure, both uplink and downlink signaling is done via the relay node 200. In this process, a decision step 56 is carried out in the network, such as in the network node 10, whether the downlink data traffic will be transmitted via direct link or via indirect link. This decision is preferably made by the network node 10, but is based on the terminal preferences as indicated by the terminal preference data 51, and also based on network node 10 preferences taking a wider system perspective into account. This decision may thus be taken based on the preference indication provided in the terminal preference data 51, and possibly even with a target to follow the preference of the terminal. However, consideration may also be made to e.g. the overall traffic situation in the cell of the network node, the connection quality or data traffic communication out with respect to the relay node 200, and other factors.

Information 57 identifying the decision taken in step 56, as to whether an in-direct or direct link will be provided for the connected mode, is transmitted to the terminal 100. Furthermore, resource data 58 for the data connection, configured according to the received information, is transmitted to the terminal 100. While the information 57 related to type of downlink connection, and the resource data 58, are indicated at a common downlink transmission, it may be noted that these pieces of information may be conveyed in separate messages.

Once the connection is setup to place the terminal 100 in connected mode, in downlink data 59A, if any, may be transmitted from the network node 10 to the terminal 100 over the relay 200. Furthermore, the terminal 100 may transmit its data in the uplink over the relay 200. It may be noted that in an alternative embodiment, connection setup control signaling may be carried out using a direct link in both uplink and downlink, to set up an uplink data connection.

Figure 6:
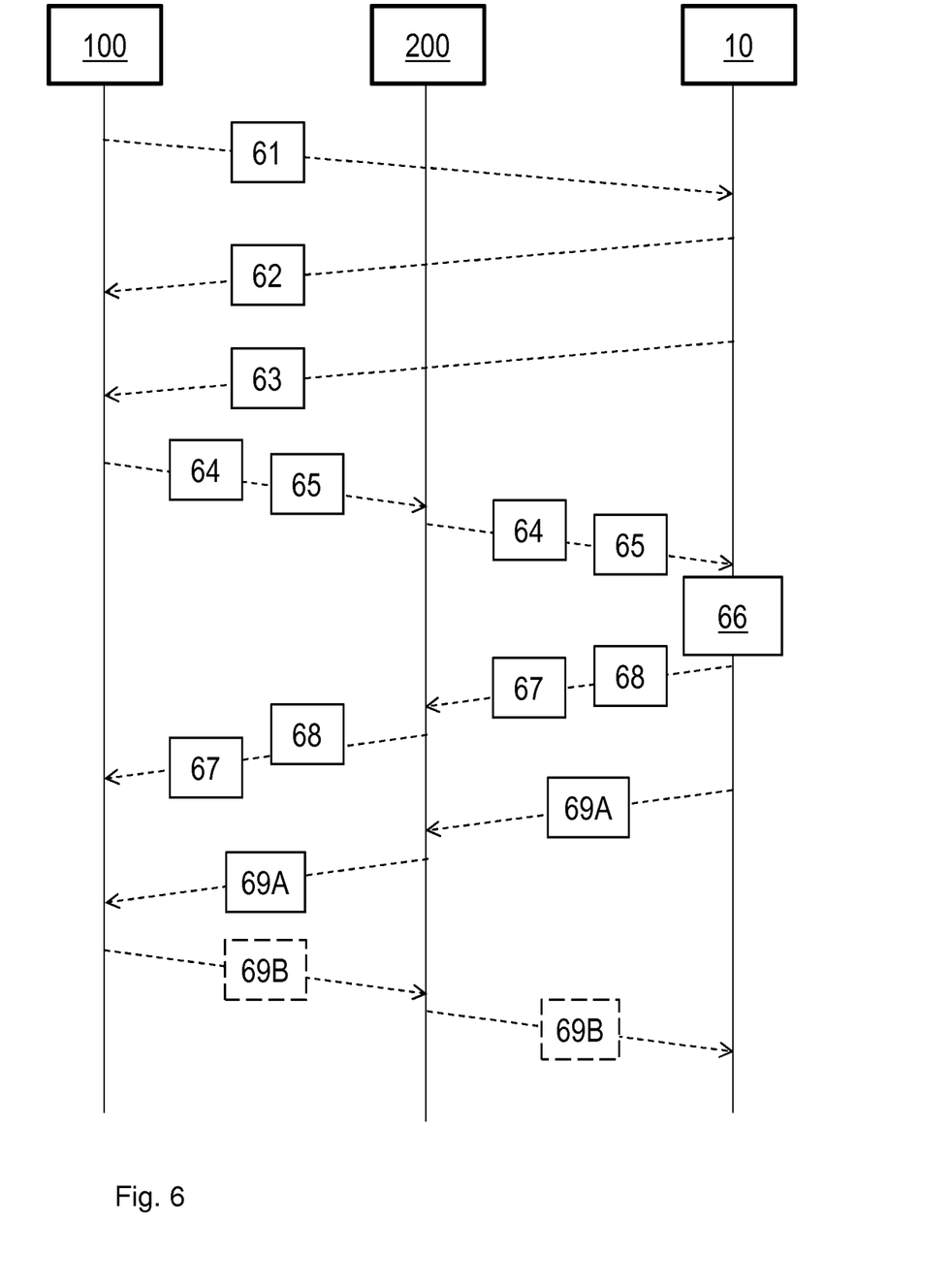
FIG. 6 schematically illustrates steps and signals conveyed in various embodiments, where connection setup is triggered by the network.

FIG. 6 schematically illustrates an exemplary embodiment of a method for setting up a connection between a terminal 100 and a wireless communication network including a network node 10, which falls within the scope of the general embodiments of FIGS. 3 and 4. This drawing illustrates a variant of the embodiment of FIG. 5, and the description related to that embodiment, such as various examples, are equally applicable to this embodiment. Again, various steps or tasks required for setting up a connection, including detection and association with a relay, may as such be carried out as already provided in e.g. R12/R13 D2D as identified.

The terminal 100 is configured to provide terminal preference data 61 to the network 10. This may be accomplished in various ways, as provided above. In one example, the terminal preference data may specify the terminal presence for downlink data as: System information=direct, paging=direct, connected=in-direct.

While no cause for setting up a connection has occurred, the terminal 100 remains in idle mode, listening to direct downlink system information 62, as provided by the terminal preference data 61.

In the scenario of FIG. 6, a trigger for setting up a connection is a paging message 63, transmitted from the network node 10 to the terminal 100. In accordance with the terminal preference data 61, the paging message is received in direct downlink.

Responsive to receipt of the paging message 63, the terminal 100 initiates a service request procedure. Based on uplink conditions, the terminal 100 sends a service request 64 via the relay node 200 to the network 10. In a preferred embodiment, the service request, or a message included in the service request procedure, may include an in-coverage indicator 65, where the in-coverage indicator 65 is configured by the terminal 100 to indicate In-coverage.

In the Service request procedure, both uplink and downlink signaling is done via the relay node 200. In this process, a decision step 66 is carried out in the network, such as in the network node 10, whether the downlink data traffic will be transmitted via direct link or via indirect link. This decision is preferably made by the network node 10, based on the terminal preferences as indicated by the terminal preference data 61, and also based on network node 10 preferences taking a wider system perspective into account.

Information 67 identifying the decision taken in step 66, as to whether an in-direct or direct link will be provided for the connected mode, is transmitted to the terminal 100. Furthermore, resource data 68 for the data connection, configured according to the received information, is transmitted to the terminal 100. While the information 67 related to type of downlink connection, and the resource data 68, are indicated at a common downlink transmission, it may be noted that these pieces of information may be conveyed in separate messages.

Once the connection is setup to place the terminal 100 in connected mode, downlink data 69A which caused the paging signal 63 to be sent, may be transmitted from the network node 10 to the terminal 100 over the relay 200. Furthermore, the terminal 100 may transmit data, if any, in the uplink over the relay 200.

Figure 7:
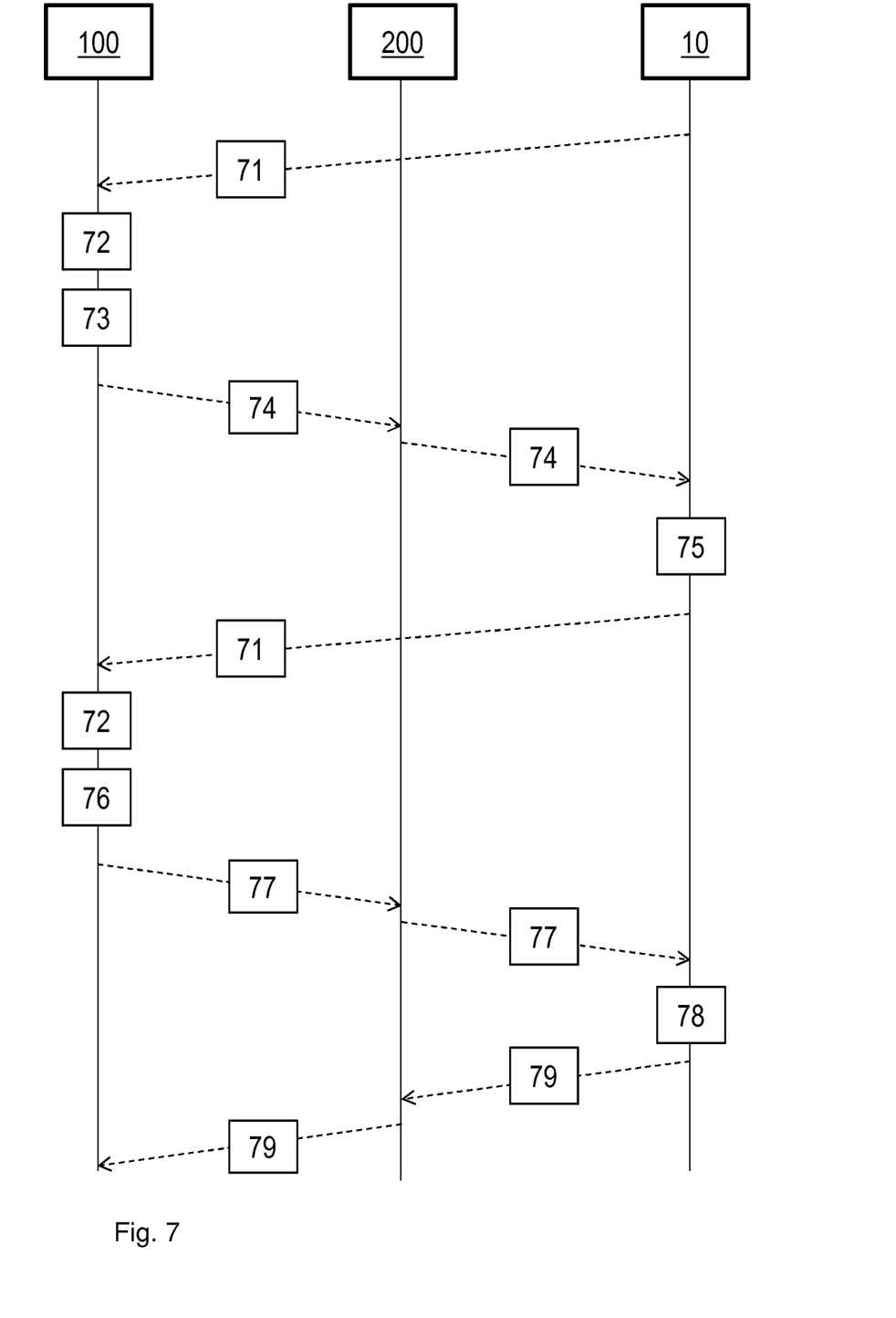
FIG. 7 schematically illustrates steps and signals conveyed in various embodiments, related to bearer modification in connected mode over a relay node.

FIG. 7 illustrates an embodiment which relates to a method for bearer modification for a terminal 100 in connected mode communication with a network node 10 of a wireless communication network. This embodiment relates to a situation wherein the terminal 100 is configured with an indirect uplink connection via a relay 200, usable for transmitting data in the uplink, and a direct downlink connection from the network node 10 for receiving data.

In the connected mode, as the terminal 100 receives downlink data 71, the terminal measures 72 signal quality such as the CQI of the downlink data 71 received from the network node 10.

The measured signal quality may be evaluated 73, e.g. by being quantified or compared with predetermined criteria, such as a signal strength or quality threshold, which may be stored in memory or be calculated in the terminal 100. This represents a remote channel evaluation, carried out by the terminal 100.

The terminal 100 signals to the network node 10 to transmit a measurement report 74 with the measured signal quality, comprising or representing e.g. CQI/RSSI measurements. Signal quality reporting may be configured according to legacy behavior, with the difference that the measurement report 74 is sent over the indirect uplink over the relay node 200. Based on the received measurement report 74, the network node 10 evaluates 75 the measured signal quality, to determine whether to maintain a direct downlink, or to change to an indirect downlink. Measuring 72 and transmitting measurement reports 74 may be repeated several times, while the terminal 100 is receiving data in the connected mode.

In a situation where the terminal 100 is close to an edge of the cell or coverage area 11B (FIG. 2), the signal quality of the downlink data 71 will get weaker. This may be determined by measuring the signal strength 72, or even concluding that data that was expected was not received.

As the measured signal quality is evaluated 76, a control unit in the terminal sets an in-coverage indicator to indicate Out-of-coverage. The terminal 100 transmits the in-coverage indicator 77 to the network node 10 over the relay node 200. This transmission may be provided as a control signal, e.g. in RRC signaling. Upon detecting 78 that the received in-coverage indicator 77 indicates Out-of-coverage, the network node transmits radio bearer modification data 79 to an indirect downlink connection from the network node, responsive to transmitting said in-coverage indicator. Note alternatively to shown in FIG. 7 the radio bearer modification data 79 could be sent directly from network node 10 to the terminal 100. Bearer modification is thus obtained to bidirectional mode, over relay node 200, in both uplink and downlink. The use of a remote evaluation of signal strength, and reporting the in-coverage indicator 77, may be beneficial for a terminal 100 with infrequent signal strength reporting 74, as the terminal 100 may convey the Out-of-coverage situation as soon as detected, and thereby trigger the network node 10 to execute bearer modification to an indirect downlink.

Figure 8:
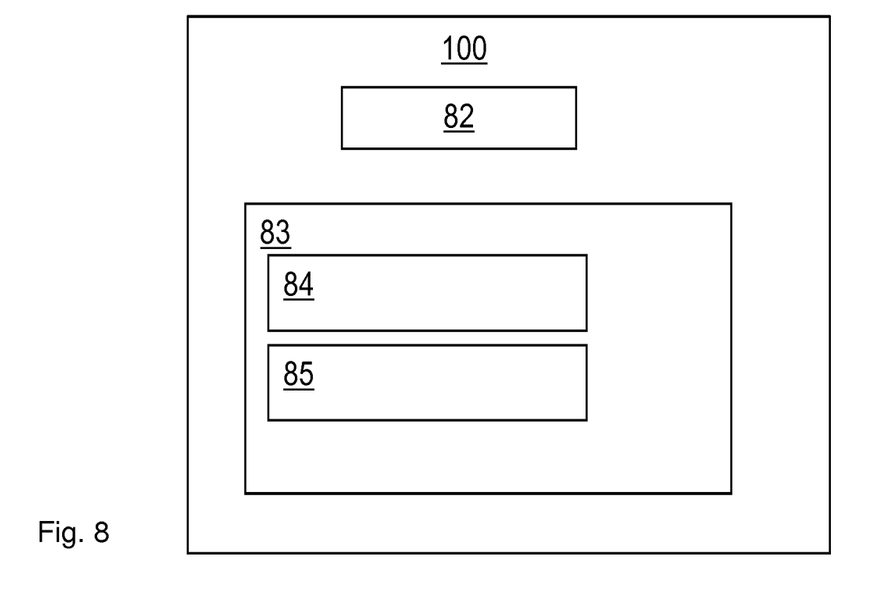
FIG. 8 schematically illustrates elements included in a terminal configured in accordance with an embodiment.

FIG. 8 schematically illustrates a terminal 100 for use in a wireless communication system, configured according to the embodiments presented herein. The terminal 100 may e.g. an eMTC device or a NB-IoT device, or other type of user device for radio communication, or a component included in such a device. Obviously, the terminal 100 may include other features and elements than those shown in the drawing or described herein, such as at least one antenna, power supply, and possibly a user interface etc.

The terminal 100 may be configured for communication with a wireless communication network, such as a radio access network, including a network node 10 such as an access node. The terminal 100 comprise a transceiver 82, such as a radio receiver and transmitter for communicating with the network node 10 through at least an air interface. The terminal 100 further comprises a control unit 83 including a data memory 84, such as a non-volatile memory, holding computer program code, and a processing device 85, such as a microprocessor. The processing device 85 is thereby configured to execute the computer program code from the memory 84, wherein the control unit 83 is configured to control the terminal 100 to carry out any of the steps outlined herein for the terminal 100. In one embodiment, the control unit 83 is configured to control the terminal 100 in a method for setting up a connection with a wireless communication network including a network node 10, to transmit terminal preference data 51 to the radio network 10, said terminal preference data indicating terminal preference to receive one of direct or indirect downlink transmission when the terminal 100 operates over a relay in the uplink;

transmit a service request 54 to the network node 10 over a relay node 200;

receive information 57 from the network node 10 indicating direct or indirect downlink data transmission;

receive resource data 58 a connection configured according to said information 57.

Figure 9:
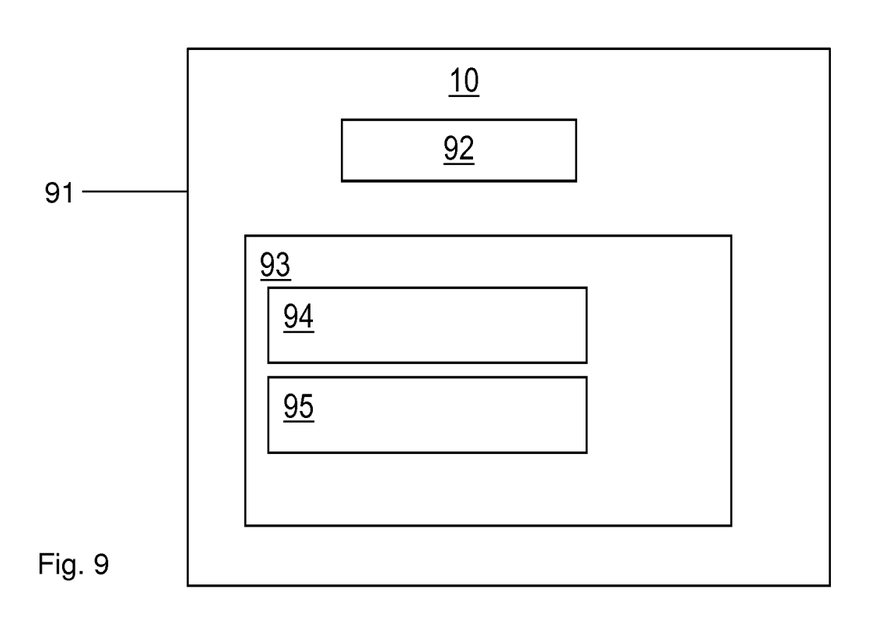
FIG. 9 schematically illustrate elements included in a network node configured in accordance with various embodiments.

FIG. 9 schematically illustrates a network node 10 for use in a wireless communication system as presented herein, and as illustrated in FIGS. 1 and 2. As noted, the network node 20 may e.g. be a gNB access node of a 3GPP 5G network, an eNB access node of a 4G network, or other. The network node 10 thus may form part of a radio access network RAN, wherein said RAN has an interface 91 to a core network 1. The network node 10 comprises a wireless interface 92 for terminal communication, preferably by radio. The network node 10 further includes a control unit 93 including a data memory 94, such as a non-volatile memory, holding computer program code, and a processing device 95, such as at least one microprocessor, configured to execute the computer program code. The control unit 93 is thus configured to control the network node 10 to carry out any of the steps outlined herein for the network node 10. In one embodiment, the control unit 93 is configured to control the network node 10 in a method for setting up a connection with a terminal 100, to receive terminal preference data 51, said terminal preference data indicating terminal preference to receive one of direct or indirect downlink transmission when the terminal 100 operates over a relay in the uplink;

receive a service request 54 from the terminal 100 over a relay node 200;

transmitting information 73 to the terminal 100, indicating direct or indirect downlink data transmission;

transmitting resource data 58 for a connection configured according to said information.

Various embodiments have been disclosed herein by way of example, to illustrate various ways of realizing methods and devices falling within the terms of the claims. Unless where specifically noted, these embodiments, or features related to those embodiments, may be combined.

The invention claimed is:

1. A method carried out in a terminal for setting up a connection with a radio network including a network node, the method comprising:

transmitting terminal preference data to the radio network in an uplink transmission, said terminal preference data indicating a preference of the terminal to receive one of direct or indirect downlink transmission when the terminal operates or intends to operate over a relay of the radio network;

transmitting a service request to the network node over the relay, wherein the service request is associated with a data connection with the radio network;

receiving information from the network node indicating a selection of a one of the direct or indirect downlink data transmission of the data connection; and receiving resource data for a connection with the radio network configured according to said received information.

2. The method of claim 1, wherein said terminal preference data indicates preference of direct or indirect downlink transmission associated with one or more of system information, paging, and downlink data.

3. The method of claim 1, wherein transmission of the service request is triggered by the terminal preparing to send data.

4. The method of claim 1, wherein transmission of the service request is triggered by receiving downlink paging from the network.

5. The method of claim 1, wherein said terminal preference data is transmitted in a Non Access Stratum procedure.

6. The method of claim 1, wherein said terminal preference data is transmitted in radio control signaling.

7. The method of claim 1, comprising transmitting an in-coverage indicator to the network, indicating whether the terminal is in or out of downlink coverage dependent on signal quality detected from said network node.

8. A method carried out in a radio network including a network node for setting up a connection with a terminal, the method comprising:

receiving terminal preference data in an uplink from the terminal, said terminal preference data indicating a preference of the terminal to receive one of direct or indirect downlink transmission when the terminal operates or intends to operate over a relay;

receiving a service request from the terminal over the relay;

transmitting information to the terminal, the transmitted information indicating a selection of a one of the direct or indirect downlink data transmission of the data connection; and transmitting resource data for a connection with the radio network configured according to said transmitted information.

9. The method of claim 8, wherein said terminal preference data indicates preference of direct or indirect downlink transmission associated with one or more of system information, paging, and downlink data.

10. The method of claim 8, wherein said service request is triggered by the terminal preparing to send data.

11. The method of claim 8, comprising transmitting a paging message to the terminal from the network node responsive to receiving a paging request from a core network, wherein said service request is triggered by said paging message.

12. The method of claim 11, comprising transmitting said paging message in accordance with said terminal preference data.

13. The method of claim 8, wherein said terminal preference data is received in a Non Access stratum procedure by the terminal.

14. The method of claim 8, wherein said terminal preference data is received from the terminal in radio control signaling.

15. The method of claim 8, wherein said information is determined based on at least radio traffic data detected in the network node, with said terminal preference data as preference.

16. The method of claim 8, comprising
receiving an in-coverage indicator from the terminal, associated with signal quality detected from said network node by the terminal.

17. The method of claim 16, wherein said in-coverage indicator is received in a terminal-initiated service request procedure.

18. The method of claim 16, wherein said information indicates indirect downlink data transmission responsive to said in-coverage indicator indicating that the terminal is out of coverage from the network node.

19. A method for bearer modification for a terminal in connected mode communication with a network node of a wireless communication network, wherein the terminal is configured with an indirect uplink connection via a relay and a direct downlink connection from the network node, the method comprising:
measuring signal quality of downlink data from the network node in the terminal;
transmitting a signal quality measurement to the network node;
transmitting an in-coverage indicator, indicating out of coverage, based on the detected signal quality; and
receiving bearer modification data of an indirect downlink connection from the network node, responsive to transmitting said in-coverage indicator.

* * * * *